Oct. 15, 1957  A. W. McDANIEL  2,809,506
TENSION TORSION DEVICE FOR HELICOPTER ROTOR BLADE SPINDLES
Filed Oct. 11, 1956

INVENTOR
ALDEN W. McDANIEL

BY
ATTORNEYS 2,809,506

TENSION TORSION DEVICE FOR HELICOPTER ROTOR BLADE SPINDLES

Alden W. McDaniel, Washington, D. C.

Application October 11, 1956, Serial No. 615,437

12 Claims. (Cl. 64—27)

(Granted under Title 35, U. S. Code (1952), sec. 266)

The invention described herein may be manufactured and used by or for the Government of the United States of America for governmental purposes without the payment of any royalties thereon or therefor.

The present invention relates to a tension torsion device for helicopter rotor spindles and more particularly to a tension torsion device for helicopter rotor spindles having flexible load carrying members mounted between the rotor housing and the rotor spindle which permits transfer of centrifugal tension loads from the rotor housing to the rotor spindle.

In the past, unsatisfactory means, such as, stacks of six or more bearings or stacks of laminated tension torsion strips attached to the housing and spindle by heavy through bolts were used to transmit the centrifugal tension loads from the housing to the spindle. The stacks of bearings have proven unsatisfactory for use with helicopter rotor housings in that the oscillatory loading encountered causes fretting corrosion and short bearing life. To provide the existing mediocre bearing life, it has been necessary to use heavy overstrength and expensive high precision bearings. The tension torsion strip bundle attachment bolts and spacers require holes and slots in the highly stressed spindle and housing. These holes and slots constitute serious stress risers in the critical stress area.

In the present invention, the unsatisfactory features of the known devices are overcome by mounting aircraft control cables or other flexible load carrying members between two rings so as to permit transfer of tension torsion loads between these rings.

An object of the present invention is to provide an improved means of transmitting blade centrifugal tension loads from the rotor housing to the rotor spindle while permitting housing rotation on the spindle for blade pitch change.

A further object of the invention is the provision of a tension torsion device that is cheaper to produce, easier to install and has a longer service life than known similar devices.

Other objects and many of the attendant advantages of this invention will be readily appreciated as the same becomes better understood by reference to the following detailed description when considered in connection with the accompanying drawings wherein.

Figure 1:
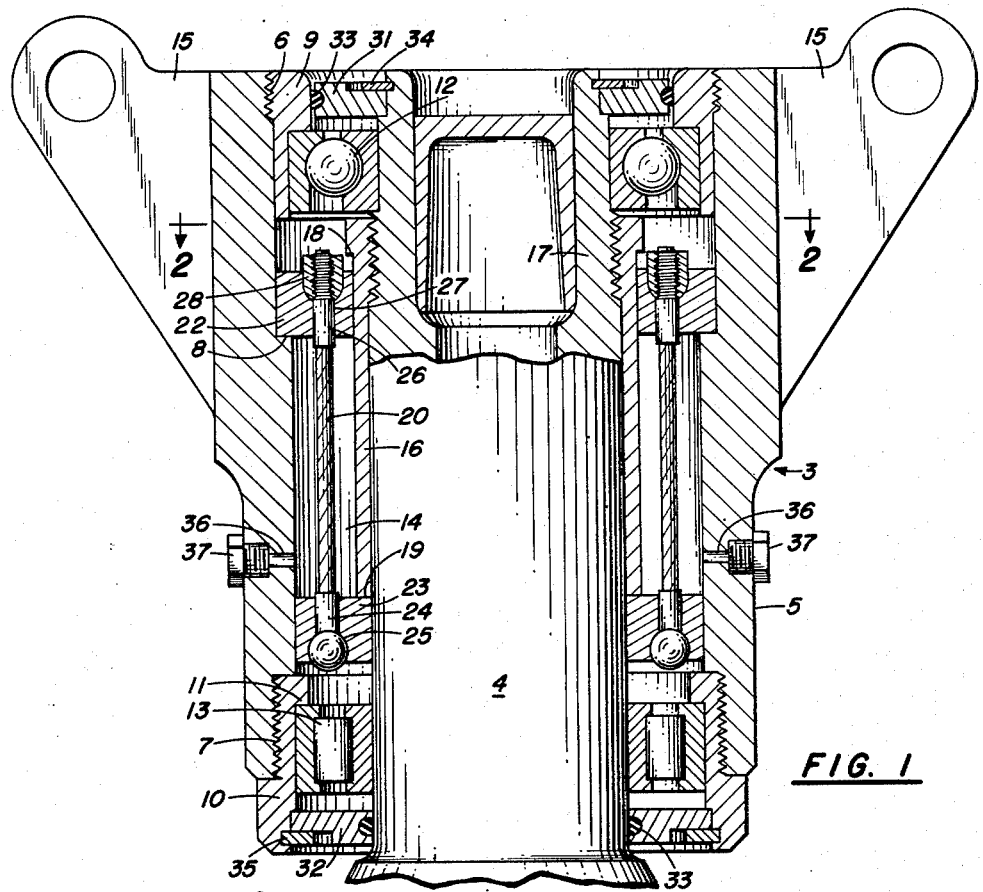
Fig. 1 is an elevation view, partly in section, of a preferred embodiment of the invention.
Figure 2:
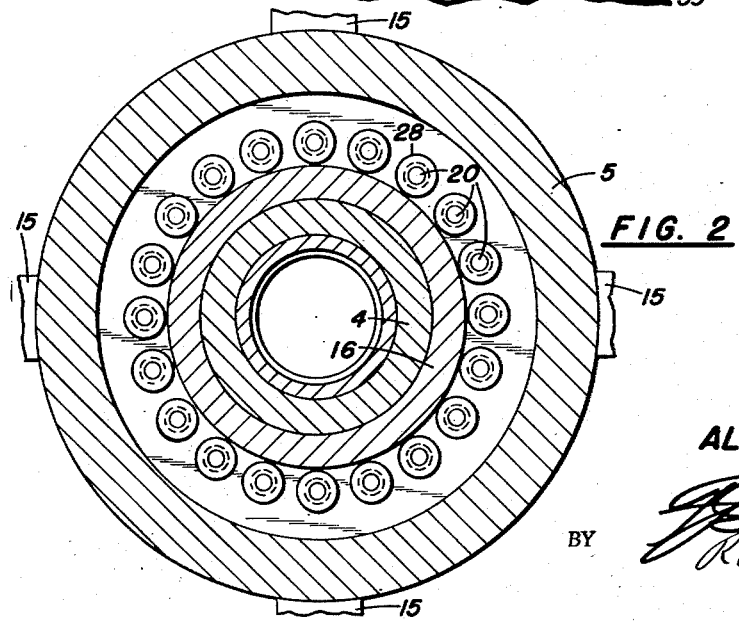
Fig. 2 is a section view taken on line 2—2 of Fig. 1.

Referring now to the drawings, wherein like reference characters designate like or corresponding parts throughout the several views, there is shown in Fig. 1 a housing 3 adapted to be rotated about rotor spindle 4 by a suitable drive means not disclosed herein. The housing 3 includes a hollow cylindrical casing 5 having internally threaded ends 6 and 7 and an internal shoulder 8. A plurality of rotor blade supports 15 protrude from the upper peripheral end of the cylindrical casing 5. Externally threaded collars 9 and 10 extend into the hollow casing 5 and are secured thereto by threaded engagement with the internal threads 6 and 7, respectively. The collar 10 is provided with a shoulder 11, whose function will hereinafter be described.

The cylindrical casing 5 is rotatably mounted on the rotor spindle 4 by means of a ball bearing 12 and a roller bearing 13 positioned on the upper and lower ends of the spindle, respectively. The races of the ball bearing 12 are supported between the collar 9 and the rotor spindle 4; and the races of the roller bearing 13 are supported between the collar 10 and the rotor spindle 4. The space provided between the casing 5 and the rotor spindle 4 due to the bearings 12 and 13 will hereinafter be referred to as a cable cage 14.

An elongated sleeve 16 is provided within the cable cage 14 and is threadedly fastened to the rotor spindle 4 by threads 17. Sleeve 16 has a shoulder 18 located at its upper end and a flat lower end 19.

A plurality of cables or other suitable flexible load carrying members 20 are mounted within the cable cage 14 by means of upper and lower rings 22 and 23, respectively. The external and internal surfaces of rings 22 and 23 slidably engage the internal wall of the casing 5, and the outer surface of the sleeve 16 and spindle 4, respectively; but the upward and downward movement of the rings 22 and 23 are limited by the shoulders 18 and 8, and end 19 and shoulder 11, respectively.

Thus, the shoulders 18, 8, 11 and end 19 function as restraining stops for the rings 22 and 23.

The lower ends of the cables 20 are provided with ball end swaged fittings 24 which are received in correspondingly shaped openings 25 in the lower ring 23. The upper ends of the cables 20 have threaded swaged fittings 26 attached thereto and extend through openings 27 in the upper ring 22.

Nuts 28 are provided to engage the threaded swaged fittings 26 and are received in the upper part of the openings 27 in the ring 22.

Oil seals 31 and 32 having O-rings 33 are provided to seal the upper and lower ends of the hollow cylindrical casing 5 so that the internal parts in the cable cage run in oil. The oil seals 31 and 32 are retained in position by means of snap rings 34 and 35, respectively.

Lubricant holes 36 are provided through casing 5 to the cable cage 14 and are closed by the filler plugs 37.

The shoulder 11 on the collar 10 is provided not only as a stop to restrict cable stretch under impact loading but also to provide an emergency fail safe restraint for the housing in the event of failure of the cable cage arrangement.

The special threaded swaged fitting 26 is used on the upper cable ends to permit jig torquing prior to installation to ensure equal cable tension.

In operation, the cylindrical casing 5 and the rotor blades are rotated about the spindle 4; the blades create a lifting force which is transmitted through the casing 5 to upper ring 22, then through the cables 16 to lower ring 23 and through sleeve 16 which is threadedly fastened to spindle 4.

It has been found that the required angular motion of the housing 3 on the spindle 4 is approximately 10 degrees each side of the center of the spindle. At the extremes of this rotation the shortening of the cables 20 amounts to approximately .005 inch; but it is considered that the inherent resilience and stretch of aircraft control cable, or the like, will absorb this small length variation.

Obviously many modifications and variations of the present invention are possible in the light of the above teachings. It is therefore to be understood that within the scope of the appended claims the invention may be practiced otherwise than as specifically described.

What is claimed is:
1. A tension torsion device for helicopter rotor blade spindles comprising a rotor spindle, a housing rotatably mounted on said spindle, flexible load carrying means, and means operatively connecting said flexible load carrying means to said spindle and said housing whereby rotor blade centrifugal tension loads are transmitted through the flexible load carrying means to the rotor spindle.
2. The combination of claim 1 wherein said spindle has upper and lower ends, said connecting means comprises upper and lower rings slidably mounted between said spindle and said housing, said flexible load carrying means connecting said rings together.
3. The combination of claim 2 and further comprising stop means positioned adjacent said upper and lower rings and between said housing and said spindle whereby said stop means limit the upward and downward movement of said rings in response to stretching of said flexible means caused by centrifugal tension loads from the rotation of said housing.
4. The combination of claim 3 and tension means connected to said flexible means for varying the tension of said members.
5. A tension torsion device for helicopter rotor blade spindles comprising a rotor spindle having lower and upper ends, a housing surrounding said spindle and spaced therefrom, lower and upper bearings in said space and rotatably mounting said housing to said spindle, flexible load carrying means in said space and between said bearings, and means operatively connecting said flexible load carrying means to said spindle and said housing, whereby rotor blade centrifugal tension loads are transmitted through the flexible load carrying means to the rotor spindle.
6. The combination of claim 5 and lubricating seals sealing the ends of said space and lubricant in said space whereby said bearings and flexible load carrying means operate with a minimum of friction.
7. The combination of claim 5 wherein said connecting means comprises lower and upper rings slidably mounted in said space and adjacent the lower and upper ends of said spindle respectively, and said flexible load carrying means connecting said lower and upper rings.
8. The combination of claim 7 and stop means positioned in said space and adjacent said lower and upper rings whereby said stop means limit the downward and upward movement of said rings in response to stretching of said flexible means caused by centrifugal tension loads from the rotation of said housing.
9. The combination of claim 7 and tension means associated with said rings and load carrying means whereby the tension on said cables is adapted to be varied.
10. The combination of claim 5 wherein said flexible load carrying means are cables.
11. A tension torsion device for helicopter rotor spindles comprising a vertical rotor spindle having lower and upper end, a housing surrounding said spindle and spaced therefrom, lower and upper bearings in said space and rotatably mounting said housing to said spindle, an elongated sleeve located in said space and secured to said spindle, one end of said sleeve forming a first lower stop and the other end of said sleeve forming a first upper stop, a second upper stop on said housing and extending into said space, a collar secured to the lower end of said housing and providing a second lower stop, a lower ring slidably mounted in said space between said first and second lower stops, an upper ring slidably mounted in said space between said first and second upper stops whereby said rings are limited in downward and upward movement by said stops, and a plurality of flexible load carrying members connecting said rings together whereby rotor blade centrifugal tension loads are transmitted through said rings.
12. The combination of claim 11 and lubricating seals sealing the ends of said space and lubricant in said space whereby said bearings, rings and flexible load carrying members operate with a minimum of friction.

References Cited in the file of this patent
UNITED STATES PATENTS

| | | |
|---|---|---|
| 1,920,086 | Lansing | July 25, 1933 |
| 2,525,580 | Beler | Oct. 10, 1950 |